(12) United States Patent
Cocchi et al.

(10) Patent No.: US 10,159,270 B2
(45) Date of Patent: Dec. 25, 2018

(54) MACHINE FOR MAKING AND DISPENSING LIQUID OR SEMI-LIQUID FOOD PRODUCTS AND RECIRCULATION METHOD

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 17 days.

(21) Appl. No.: 15/399,459

(22) Filed: Jan. 5, 2017

(65) Prior Publication Data
US 2017/0208842 A1 Jul. 27, 2017

(30) Foreign Application Priority Data

Jan. 21, 2016 (IT) .................. 102016000005774

(51) Int. Cl.
*A23L 3/22* (2006.01)
*A23G 9/28* (2006.01)
(Continued)

(52) U.S. Cl.
CPC ............. *A23L 3/22* (2013.01); *A23C 3/031* (2013.01); *A23G 3/0226* (2013.01); *A23G 9/28* (2013.01);
(Continued)

(58) Field of Classification Search
CPC ......... A23G 3/0226; A23L 3/001; A23L 3/22; A23L 3/003; A23V 2002/00;
(Continued)

(56) References Cited

U.S. PATENT DOCUMENTS

| 2,621,908 A | * | 12/1952 | Young | B67D 3/047 |
| | | | | 137/607 |
| 3,746,570 A | * | 7/1973 | McIntosh | B05C 11/10 |
| | | | | 222/146.1 |

(Continued)

FOREIGN PATENT DOCUMENTS

| EP | 2708141 A1 | 3/2014 | |
| EP | 2923581 A1 | 9/2015 | |
| GB | 277554 | * 9/1927 | ............... B67D 1/16 |

OTHER PUBLICATIONS

Italian Search Report dated Sep. 15, 2016 from counterpart Italian App No. IT UB20160395.

*Primary Examiner* — Frederick C Nicolas
*Assistant Examiner* — Bob Zadeh
(74) *Attorney, Agent, or Firm* — Shuttleworth & Ingersoll, PLC; Timothy Klima

(57) ABSTRACT

The invention relates to a machine for making and dispensing liquid or semi-liquid food products, having:
  at least one tank for containing the product to be processed and dispensed and having a discharge orifice for the product to be dispensed;
  at least one dispensing tap having:
  an external conduit having an inlet orifice which is connected, in use, to the discharge orifice of the containment tank, a product release orifice and a product recirculation orifice,
  a tubular duct having formed in it a first internal cavity which is provided with at least one radial opening.

16 Claims, 7 Drawing Sheets

(51) Int. Cl.
   *A23G 9/30* (2006.01)
   *A23G 3/02* (2006.01)
   *A23L 3/00* (2006.01)
   *A23C 3/03* (2006.01)

(52) U.S. Cl.
   CPC ............. *A23G 9/305* (2013.01); *A23L 3/001* (2013.01); *A23V 2002/00* (2013.01)

(58) Field of Classification Search
   CPC ......... B67D 1/0054; B67D 1/16; B05C 11/10; B65D 83/0044; B65G 65/40
   See application file for complete search history.

(56) References Cited

U.S. PATENT DOCUMENTS

| | | | | |
|---|---|---|---|---|
| 4,142,654 | A * | 3/1979 | Doubleday | B05B 9/0426 222/309 |
| 5,016,446 | A * | 5/1991 | Fiedler | A23G 9/163 222/146.6 |
| 5,431,302 | A * | 7/1995 | Tulley | B67D 1/1213 222/14 |
| 5,535,923 | A * | 7/1996 | Fujioka | B08B 9/0323 137/212 |
| 5,692,392 | A | 12/1997 | Swier | |
| 8,225,958 | B2 * | 7/2012 | Nielsen | B67D 3/045 220/281 |
| 8,453,876 | B2 * | 6/2013 | Miller | B44D 3/003 222/1 |
| 2008/0128260 | A1 * | 6/2008 | Balass | B01D 5/0012 202/176 |
| 2015/0276134 | A1 * | 10/2015 | Cocchi | F17D 3/10 222/1 |
| 2017/0208842 | A1 * | 7/2017 | Cocchi | A23L 3/22 |

* cited by examiner

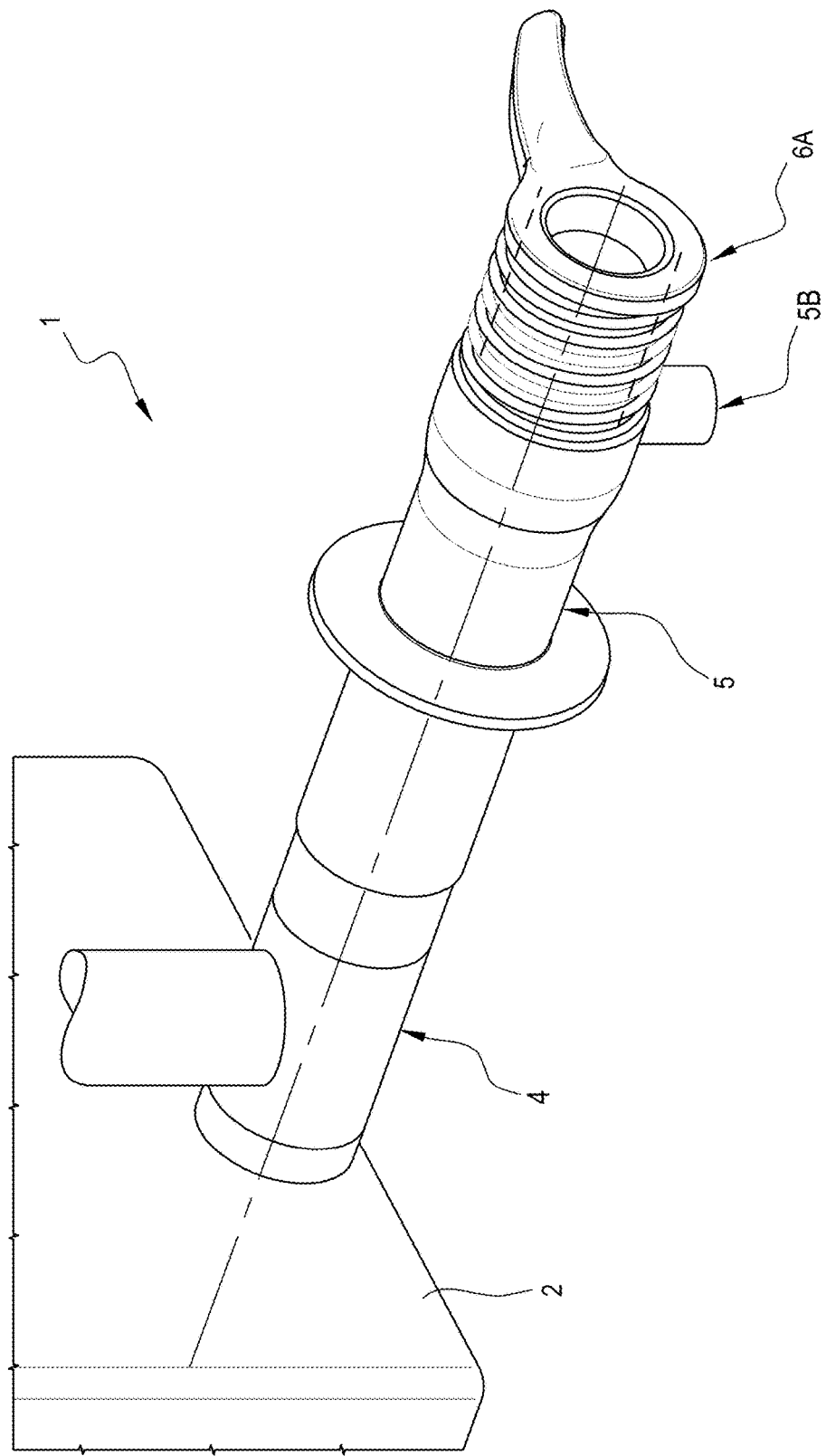

FIG. 2A
FIG. 2B
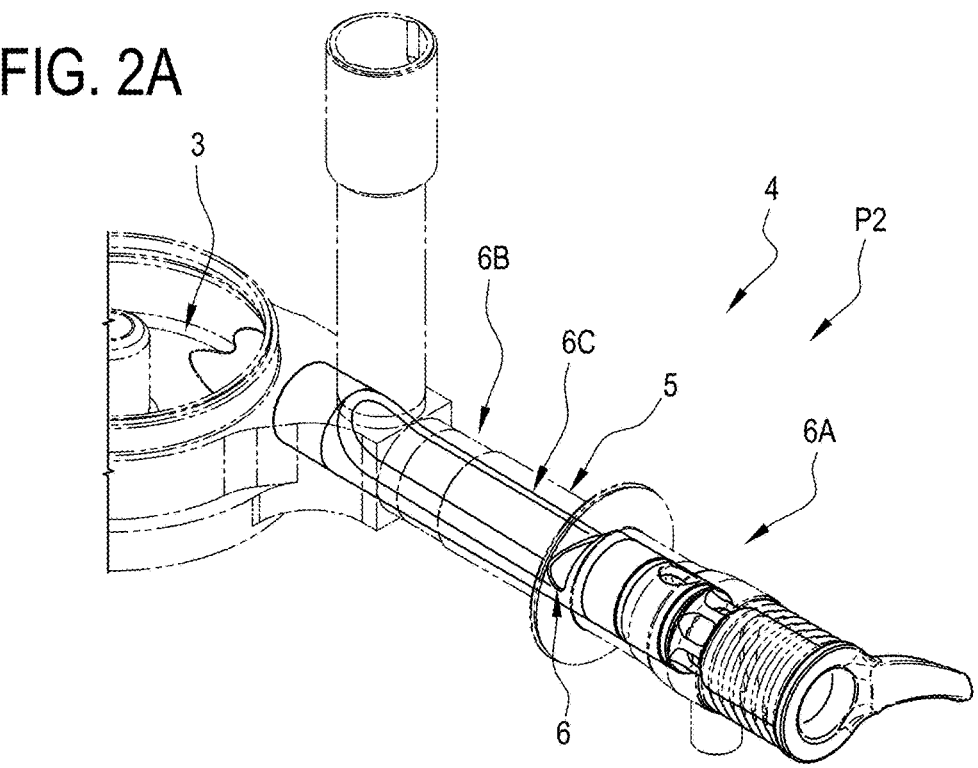
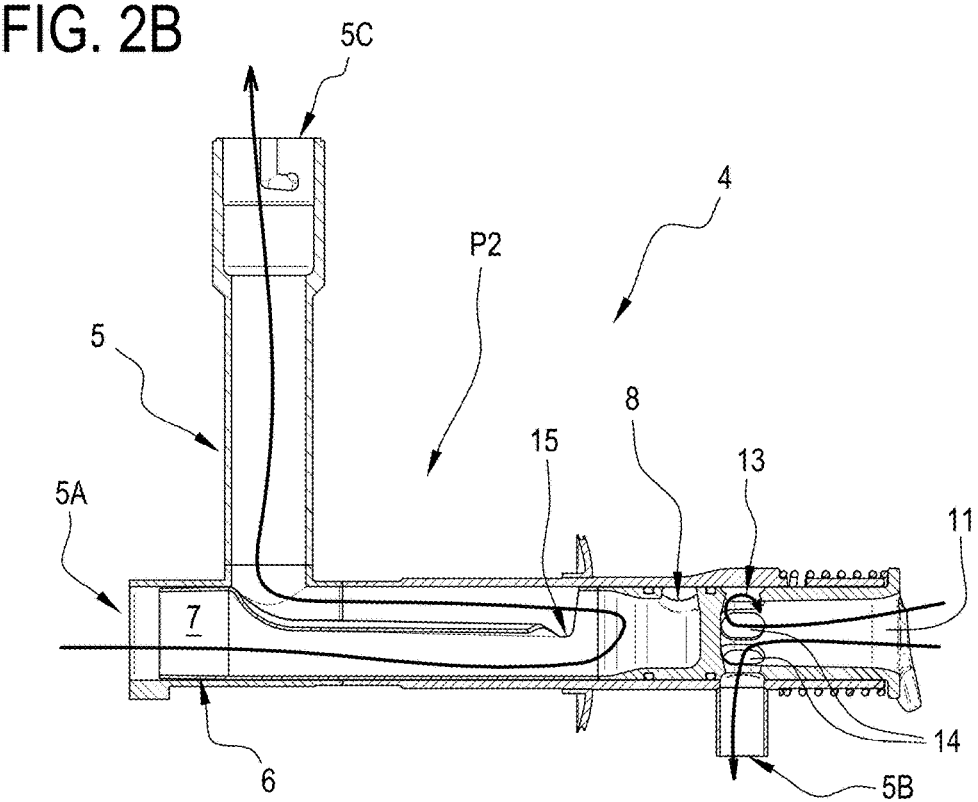

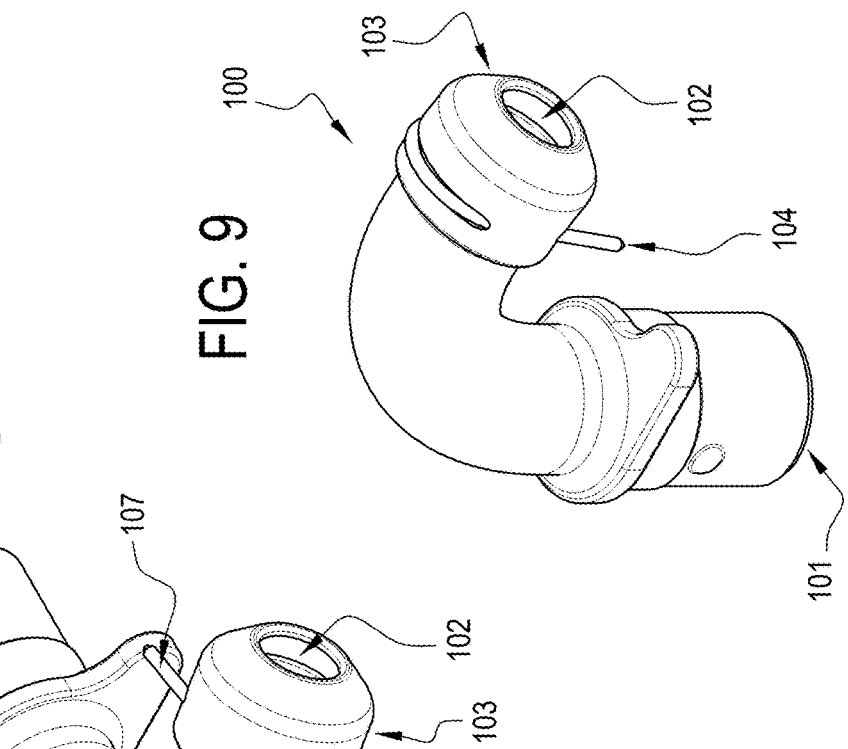
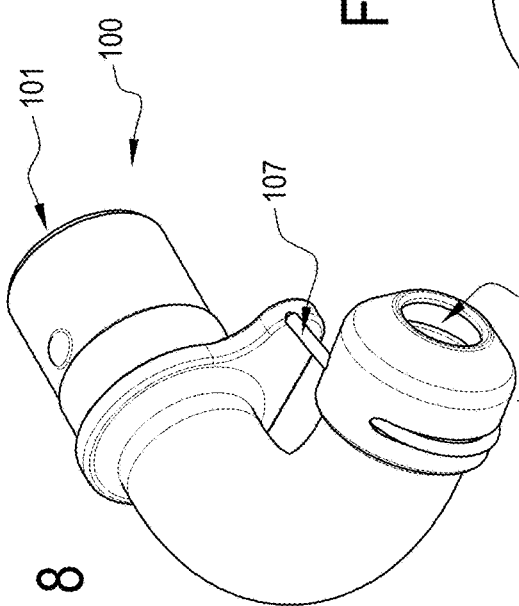
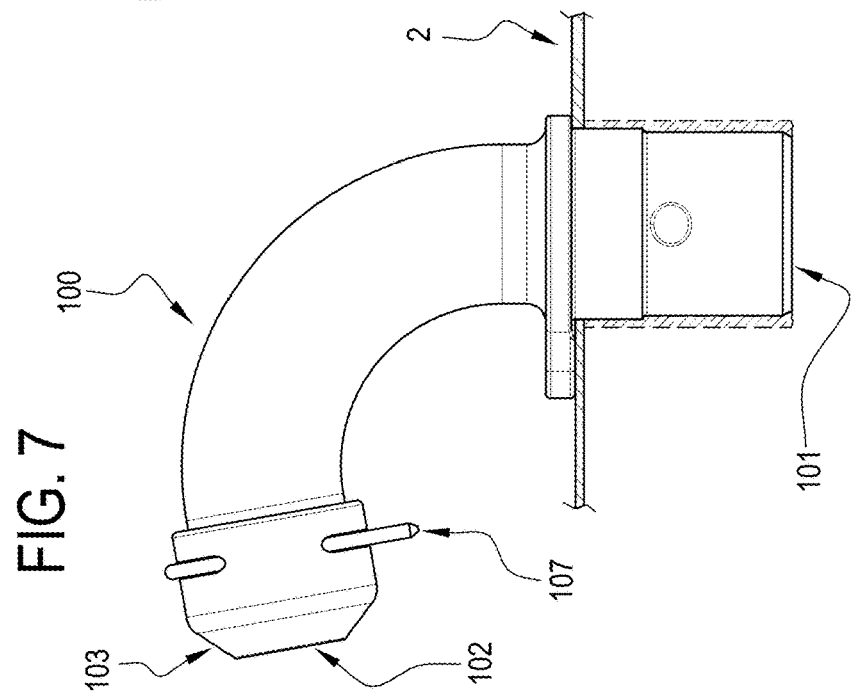

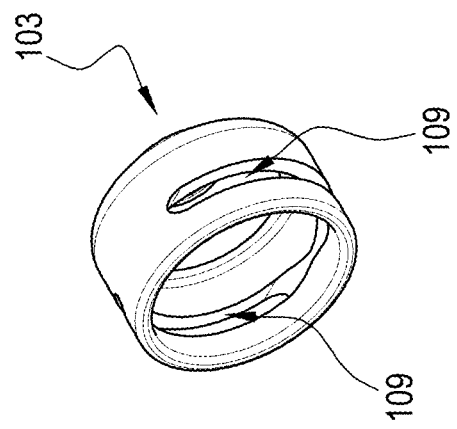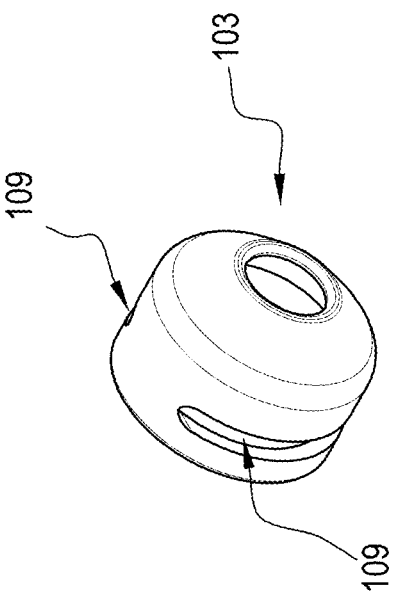

MACHINE FOR MAKING AND DISPENSING LIQUID OR SEMI-LIQUID FOOD PRODUCTS AND RECIRCULATION METHOD

This application claims priority to Italian Patent Application 102016000005774 filed Jan. 21, 2016, the entirety of which is incorporated by reference herein.

BACKGROUND OF THE INVENTION

This invention relates to a machine for making and dispensing liquid or semi-liquid food products and to a method for recirculating the liquid or semi-liquid product in the machine.

More specifically, this invention relates to machines for making and dispensing food products, such as, for example, ice creams, whipped cream, creams, chocolate, yogurt, and the like, which require thermal treatment in their production cycles.

Machines of this kind are known as "pasteurizers", capable of mixing, cooking, pasteurizing, homogenizing, cooling, aging and storing under perfect conditions of hygiene, diverse speciality foods of the patisserie, ice cream and gourmet sectors.

Hereinafter, this specification refers explicitly to these pasteurizers without losing in generality.

Generally speaking, these machines comprise a tank for containing the product to be processed, at least one dispensing tap mounted at the bottom of the front of the tank and a stirrer mounted inside the tank for mixing the product.

According to known methods, the thermal treatment is generally performed by means of electrical resistors and/or a heating system based on a thermodynamic cycle.

The product is thus processed both mechanically, by means of the stirrer, and thermally, by means of heating and/or cooling units.

These pasteurizers require frequent cleaning and sanitizing operations to prevent the proliferation of bacteria, especially inside the tap, where product residues easily get trapped.

A particularly strongly felt need is that of being able to clean the parts inside the tap without removing the tap.

Another need that is felt particularly strongly is that for a pasteurization cycle where the product inside the pasteurizer is made to recirculate also through the tap and which is particularly easy to run because it does not require any machine parts and/or the tap to be removed and refitted.

SUMMARY OF THE INVENTION

This invention has for an aim to meet the above mentioned needs.

More specifically, the aim of this invention is to provide a machine for making and dispensing liquid or semi-liquid food products where the tap can be sanitized more easily than what is provided in the prior art.

This aim is fully achieved by the machine of the invention as disclosed herein.

This aim is also achieved by the method of this invention for recirculating a liquid or semi-liquid product.

BRIEF DESCRIPTION OF THE DRAWINGS

The technical features and advantages of the invention are more apparent in the following description of a preferred but non-limiting embodiment of it. The description refers to the accompanying drawings, which are also provided purely by way of non-limiting example and in which:

FIG. 1 shows a preferred embodiment of the machine according to the invention; with some parts cut away for clarity;

FIG. 2A is a perspective view in transparency showing a detail of the machine of FIG. 1 in a first configuration;

FIG. 2B is a cross section of a detail of the machine of FIG. 1 in a first configuration;

FIGS. 5 to 9 are respective views of a detail of the machine of the preceding figures and showing, in particular, an outlet nozzle adapted to be coupled, in fluid connection, to the recirculation section the tap;

FIGS. 10 and 11 show respective perspective views of a detail of the outlet nozzle of FIGS. 5 to 9.

DESCRIPTION OF THE PREFERRED EMBODIMENTS

Figure 3A:
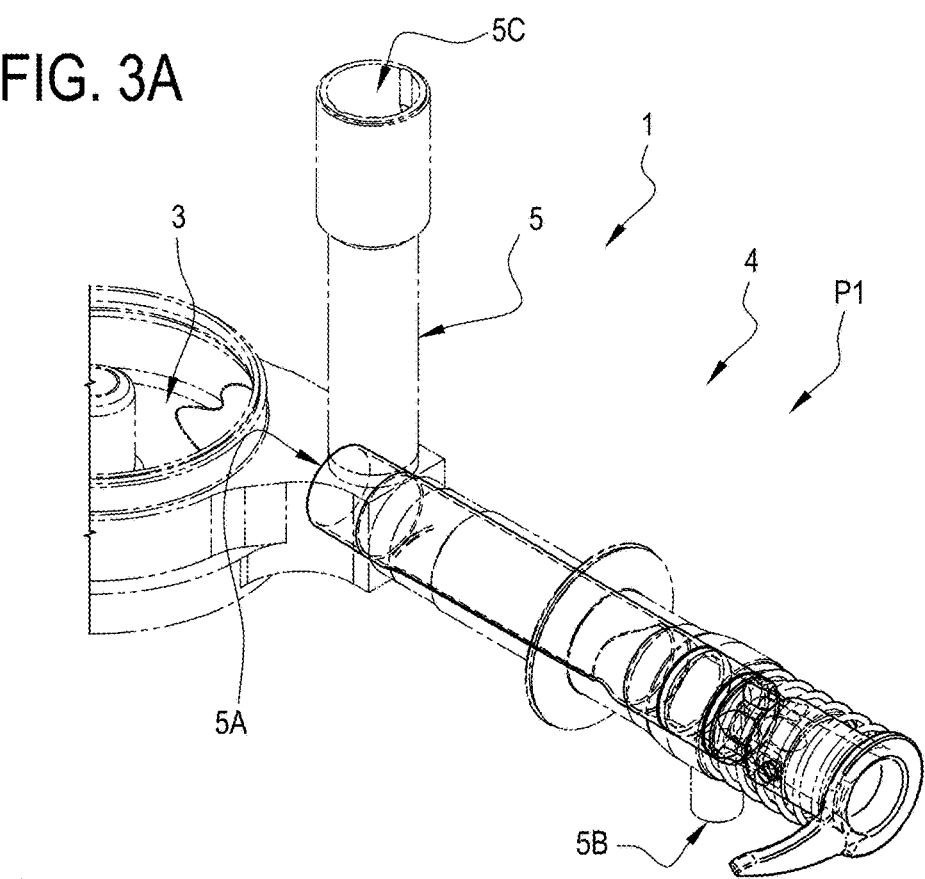
FIG. 3A is a perspective view in transparency showing a detail of the machine of FIG. 1 in a second configuration.

With reference to FIG. 1, the numeral 1 denotes in its entirety a machine for making and dispensing liquid or semi-liquid food products.

More specifically, the machine 1 is what is known as a "pasteurizer". For example, the food products may be ice creams, whipped cream, creams, chocolate, yogurt or like products.

The machine 1 preferably comprises:
at least one tank 2 for containing the product to be processed and dispensed, the tank 2 having a discharge orifice 3 for the product to be dispensed;
at least one dispensing tap 4 comprising:
an external conduit 5 having an inlet orifice 5A which is connected, in use, to the discharge orifice 3 of the containment tank 2, a product release orifice 5B and a product recirculation orifice 5C,
a tubular duct 6 having formed in it a first internal cavity 7 which is provided with at least one radial opening 8, being movably inserted in the external conduit 5 and being configured to be movable between a dispensing position P1, where it places the inlet orifice 5A in fluid communication with the release orifice 5B through the first cavity 7 and the radial opening 8, and a recirculation, dispensing inhibit position P2, where it places the inlet orifice 5A in fluid communication with the recirculation orifice 5C through the first cavity 7 and prevents the fluid communication between the inlet orifice 5A and the release orifice 5B.

It should be noted that, in use, the recirculation orifice 5C is in fluid communication with the tank 2, that is to say, it allows the product extracted from the tank 2 to be fed back therein.

The machine 1 comprises a frame (not illustrated) which mounts the tank 2 containing the product to be processed and dispensed.

The dispensing tap 4 is mounted to the discharge orifice 3 of the tank 2.

The discharge orifice 3 is located at the bottom of the front of the tank 2.

According to another aspect, the external conduit 5 has a further (front) opening 9 through which the tubular duct 6 is inserted into the external conduit 5.

The tank 2 of the machine 1 is also equipped, in known manner not illustrated here, with at least one power-driven stirrer mounted inside it to mix the product contained in the tank 2.

The machine 1 also comprises thermal treatment means acting on the product inside the tank 2.

According to yet another aspect, the tubular conduit 6 is at the recirculation position P2 when it is at a first axial position relative to the external conduit 5 proximal to the inlet orifice 5A and at a first angular position of rotation relative to the external conduit 5.

According to this aspect, the tubular conduit 6 is at the dispensing position P1 when it is at a second axial position relative to the external conduit 5 distal from the inlet orifice 5A and at a first angular position of rotation relative to the external conduit 5.

In simpler terms, in passing from the dispensing position P1 to the recirculation position P2, the tubular duct 6 is axially translated into the external conduit 5 and rotated angularly relative to the external conduit 5.

It should be noted that at the dispensing position P1, the tubular duct 6 is translated axially into the external conduit 5 and rotated angularly relative to the external conduit 5 in such a way that the radial opening 8 is substantially aligned with, that is, in fluid communication with, the release orifice 5B of the external conduit 5.

It should be noted that the external conduit 5 is substantially composed of one or more elements that define a conduit having an internal cavity for circulating the liquid or semi-liquid product.

According to another aspect, the tubular duct 6 has a first end portion 6A and a second end portion 6B opposite thereto.

Preferably, the first end portion 6A is radially provided with the radial opening 8 which is adapted to be placed in fluid communication with the product release orifice 5B when the tubular duct 6 is at the dispensing position P1.

It should be noted that, in use, the second end portion 6B is preferably positioned entirely inside the external conduit 5.

It should be noted that, in use, the first end portion 6A is preferably positioned partly inside the external conduit 5.

More precisely, the tubular duct 6 has, between the first end portion 6A and the second end portion 6B, a middle portion 6C having at least one narrow section part, the radial opening 8 being made in the middle portion 6C in order to establish fluid communication with the recirculation orifice 5C when the tubular duct 6 is at the recirculation position P1.

It should be noted that the middle portion 6C is preferably provided with a further opening 15 which, in use, is facing towards the internal side wall of the external conduit 5.

According to yet another aspect, the first end 6A has formed in it a second cavity 11, which is axially open towards the outside and which is separate from the first cavity 7, and a narrow radial section portion, which externally defines a radial cavity 13 and which has a plurality of radial holes 14 which open internally into the second cavity According to another aspect, the tubular duct 6 is also movable into a position where at least some of the radial holes 14 are in fluid communication with the release orifice 5B.

According to another aspect, the tubular duct 6 is configured in such a way that at the second, recirculation position P2, at least some of the radial holes 14 (preferably all of them) are in fluid communication with the release orifice 5B.

Below is a description of how the machine 1 works, with reference to the accompanying drawings, in order to better clarify the invention.

Figure 3B:
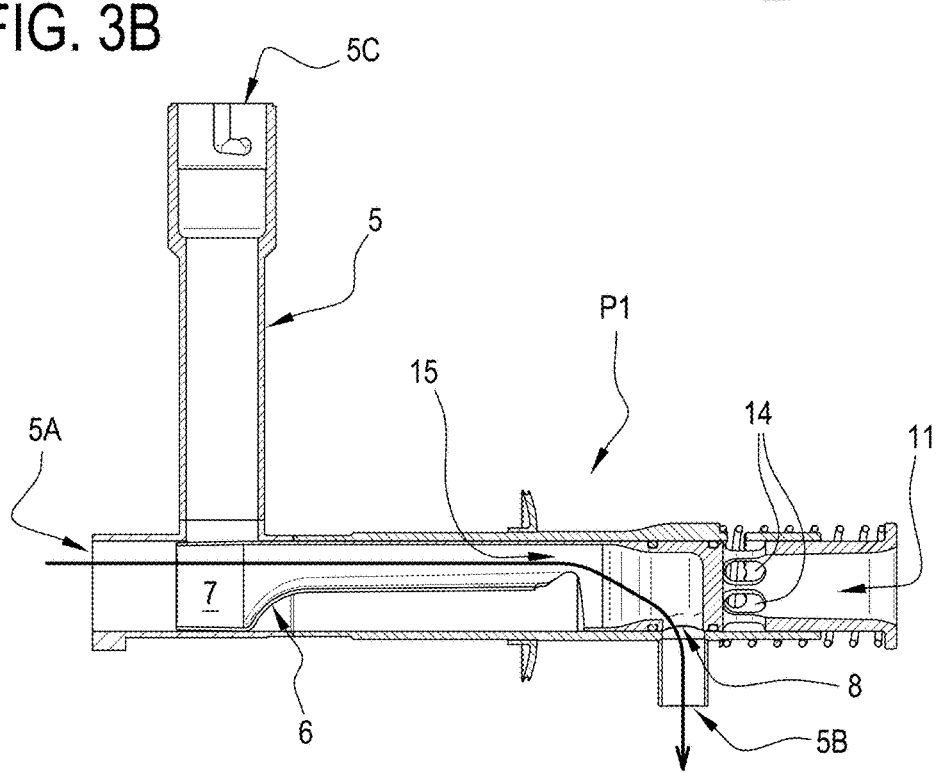
FIG. 3B is a cross section of a part of the machine of FIG. 1 in a second configuration.
Figure 4:
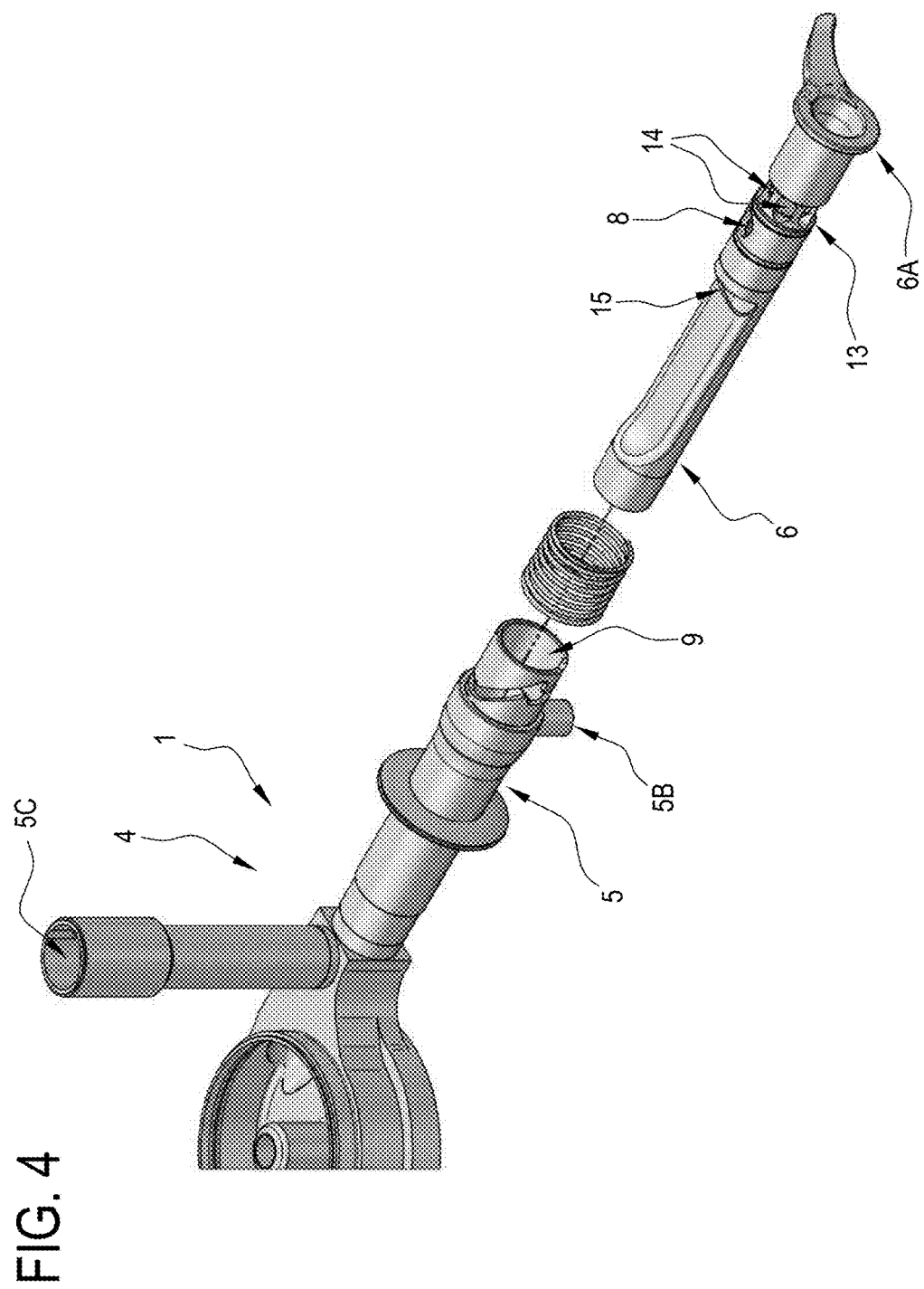
FIG. 4 is an exploded view of a part of the machine of FIG. 1.
Figure 5:
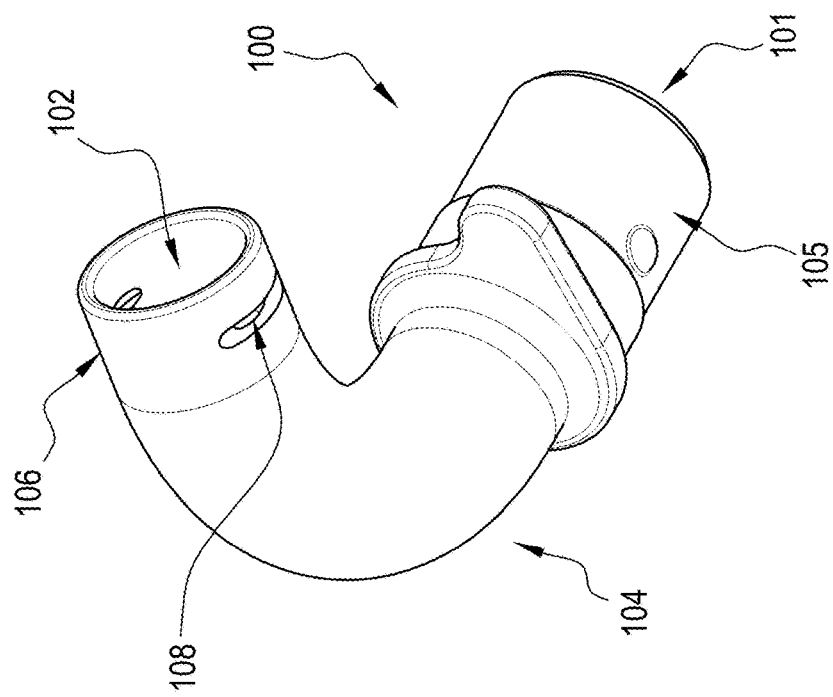
Figure 6:
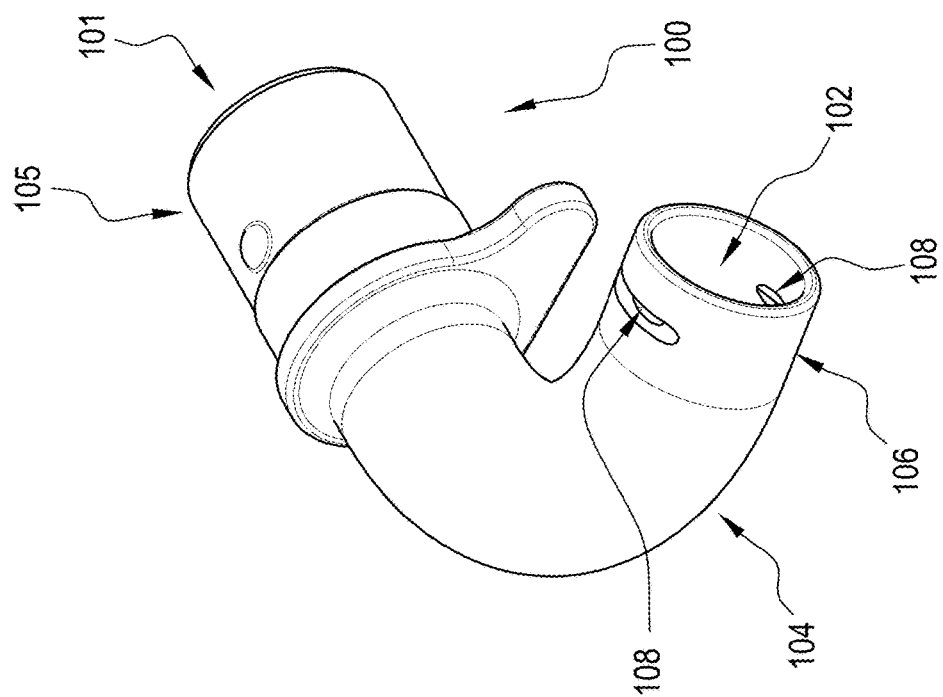

When the processed liquid or semi-liquid product inside the tank 2 needs to be dispensed, the tubular duct 6 is placed at the dispensing position P1 (illustrated in FIGS. 3A and 3B).

It should be noted that at the dispensing position P1, the inlet orifice 5A is in fluid communication with the product release orifice 5B through the opening 8 provided in the first cavity 7 of the tubular duct 6.

Thus, in order to dispense it, the liquid or semi-liquid product is made to flow out of the tank 2 through the discharge orifice 3, enters the inlet orifice 5A and flows through the first cavity 7 of the tubular duct 6 (and out through the opening 8 and the release orifice 5B).

It should be noted that the tubular duct 6 is angularly oriented in such a way that the opening 8 is aligned with, that is, in fluid communication with, the release orifice 5B: that way, the fluid passing through the first cavity 7 of the tubular duct 6 can flow out through the release orifice 5B.

The above describes the procedure implemented to allow dispensing the liquid or semi-liquid product inside the tank 2.

Instead, when the product inside the tank 2 needs to be recirculated in order to thermally treat it (for example to pasteurize it by recirculating it), the tubular duct 6 is placed in the recirculation position P2 (illustrated in FIGS. 2A and 2B).

Compared to the dispensing position P1, the tubular duct 6 is moved axially into, and relative to, the external conduit 5 and is also rotated in such a way that the opening 8 of the first cavity 7 is not in fluid communication with the release orifice 5B.

In this configuration, as illustrated in FIG. 3B, the liquid or semi-liquid product which enters through the inlet orifice 5A flows into the tubular duct 6 where it is made to reverse its direction of movement and to flow towards the recirculation orifice 5C (located above).

It should be noted that the liquid or semi-liquid product is thus brought into contact with a region near the release orifice 5B, allowing the entire region of the dispensing tap 4 close to the release orifice 5B to be thermally treated (cooled or heated).

It should be noted, as may be inferred from FIG. 3B, that preferably, when the tubular duct 6 is at the recirculation position P2, it is also possible to clean the front portion of the dispensing tap 4.

In effect, in that configuration, a cleaning fluid can be introduced at the second cavity 11 of the first end 6A of the tubular duct 6 and made to flow out through the holes 14 and recovered through the release orifice 5B.

Thus, while a part of the dispensing tap 4 is being subjected to a pasteurization treatment by recirculation, another part of the dispensing tap 4 can be simultaneously subjected to a cleaning treatment.

It should be noted that the dispensing tap 4 is, advantageously, particularly safe in terms of food hygiene because pasteurization and/or cleaning as described above allow drastically reducing the bacteria population that would otherwise thrive in the dispensing tap 4.

The machine 1 is thus particularly safe in terms of food hygiene.

It should also be noted that the dispensing tap 4 is particularly simple and inexpensive.

According to another aspect, also defined is a method for recirculating a liquid or semi-liquid product in a machine 1 for making liquid or semi-liquid products, comprising the following steps:

preparing at least one tank 2 for containing the product to be processed and dispensed, the tank 2 having an orifice 3 for discharging the product to be dispensed;

preparing at least one dispensing tap 4 comprising:

an external conduit 5 having an inlet orifice 5A, which is connected to the discharge orifice 3 of the containment tank 2, and a product release orifice 5B, causing the liquid or semi-liquid product to recirculate by withdrawing it from the containment tank 2 through the discharge orifice 3, causing it to flow at least partly inside the external conduit 5 of the dispensing tap 4 and returning it into the containment tank.

According to yet another aspect, the step of causing the liquid or semi-liquid product to recirculate comprises a step of changing the direction of movement of the liquid or semi-liquid product inside the external conduit 5.

Preferably, the step of causing the liquid or semi-liquid product to recirculate comprises a step of reversing the direction of movement of the liquid or semi-liquid product inside the external conduit 5.

According to yet another aspect, the step of causing the liquid or semi-liquid product to recirculate comprises a step of keeping the product release orifice 5B closed while the liquid or semi-liquid product is flowing through the inside of the external conduit 5.

According to yet another aspect, the step of preparing an external conduit 5 comprises a step of preparing an external conduit 5 having a recirculation orifice 5C (through which the liquid or semi-liquid product is made to flow out of the external conduit 5, during the recirculation step).

According to a yet further aspect, the step of preparing at least one dispensing tap 4 comprises a step of preparing at least one dispensing tap 4 comprising a tubular duct 6 provided with at least a first cavity 7 on which there is formed a radial opening 8, which is movably inserted in the external conduit 5 and which is configured to be movable between a dispensing position P1, where it places the inlet orifice 5A in fluid communication with the release orifice 5B through the radial opening, and a recirculation and inhibit position P2, where it places the inlet orifice 5A in fluid communication with the recirculation orifice 5C and prevents the fluid communication between the inlet orifice 5A and the release orifice 5B.

According to this aspect, the step of causing the liquid or semi-liquid product to recirculate comprises a step of placing the tubular duct 6 at the recirculation position P1.

A further aspect connected with recirculation and relevant to the invention will now be described.

Preferably, the recirculation orifice 5C opens into the tank 2 of the machine 1.

More specifically, inside the tank 2 there is an opening which communicates with the recirculation orifice 5C (by way of a conduit).

It should be noted that in order to regulate the recirculation flow rate, according to one aspect of the invention, the machine 1 comprises an outlet nozzle 100.

The outlet nozzle 100 is adapted to be coupled to the opening of the tank 2.

The outlet nozzle 100 is illustrated in FIGS. 5 to 11.

It should be noted that the nozzle 100 comprises a first, inlet portion 101, adapted to be coupled to the opening of the tank 2 and having a first flow-through section for the liquid or semi-liquid product.

The nozzle 100 also comprises a second, outlet portion 102 having a second flow-through section for the liquid or semi-liquid product different from the first section.

It should be noted that the nozzle 100 preferably comprises a first member 104 and an element 103 designed to be coupled to the first member 104 to define the second, outlet section.

The first member 104 is provided with a portion 105 for coupling to the opening of the tank 2 and adapted to be inserted into the opening of the tank.

The element 103 is adapted to be removably coupled to the first member 104 to allow adjusting the second, outlet section particularly easily and quickly according to the user's requirements.

It should be noted that the element 103 is keyed to a portion 106 of the first member 104 (the first portion 106 being opposite to the portion 105 for coupling to the opening of the tank 2).

The portion 106 of the first member 104 has slots 108 made in it (on its circumferential periphery).

The element 103 has at least one through slot 109 made in it (on its circumferential periphery).

Preferably, the element 103 has two through slots 109 made in it.

As may be inferred from FIGS. 7 to 9, the element 103, when it is keyed to a portion 106 of the first member 104, is locked to the member 104 by means of a locking element 107 (which is U-shaped).

The locking element 107 is inserted through the slots 109 of the element 103 and engages the slots 108 of the portion 106 of the member 104 in such a way as to lock the element 103 to the member 104 (preventing rotation and translation).

It should be noted that the element 103 might also be locked to the member 104 in other ways.

According to what is described above, a particularly simple solution is provided which allows recirculating the liquid or semi-liquid product and which can be adapted extremely quickly to different types of product or machine user requirements.

In effect, it is sufficient to change the element 103 (while keeping the member 104 unchanged) to vary extremely easily the outflow cross section of the recirculation outlet duct, this cross section being determined by the narrower product outlet section of the element 103.

Advantageously, according to this aspect, it is particularly simple and inexpensive to provide machine users with flexible, low cost solutions for recirculating the liquid or semi-liquid product: in effect, the member 104 may be the same for all machines, whilst only the element 103 need be varied.

According to another aspect, the machine preferably comprises at least one sensor adapted to detect whether or not the outlet nozzle 100 is coupled to the opening of the tank 2.

The sensor is adapted to generate a signal and is connected to a unit for controlling and driving the machine 1.

According to this aspect, the member 104 preferably comprises one or more magnets and the opening is provided with elements for detecting the magnets.

It is thus advantageously possible to detect whether the member 104 is correctly inserted in the opening of the tank 2 so as to prevent malfunctioning due to machine operation with the member 104 incorrectly coupled.

FIG. 7 shows the outlet nozzle 100 applied to the tank 2: the first portion 101 is shown inserted in the opening present on the bottom of the tank 2.

What is claimed is:

1. A machine for dispensing a liquid or semi-liquid food product, comprising:
   a tank for containing the product to be processed and dispensed, the tank including a discharge orifice for the product to be dispensed;
   a dispensing tap comprising:
      an external conduit having an inlet orifice which is connected, in use, to the discharge orifice of the tank, a product release orifice and a product recirculation orifice,
      a tubular duct including a first internal cavity including a radial opening, the tubular duct being movably inserted in the external conduit and being movable between a dispensing position, placing the inlet orifice in fluid communication with the product release orifice through the first internal cavity and the radial opening, and a recirculation, dispensing inhibit position, placing the inlet orifice in fluid communication with the product recirculation orifice through the first internal cavity and preventing fluid communication between the inlet orifice and the product release orifice.

2. The machine according to claim 1, wherein the external conduit includes a further opening through which the tubular duct is inserted into the external conduit.

3. The machine according to claim 1, wherein the tubular duct is movable relative to the external conduit between a first axial position and a second axial position, where the first axial position is closer to the inlet orifice than the second axial position, wherein the tubular duct is at the recirculation, dispensing inhibit position when at the first axial position and at a first angular position of rotation relative to the external conduit, and wherein the tubular duct is at the dispensing position when at the second axial position and at a second angular position of rotation relative to the external conduit.

4. The machine according to claim 1, wherein the tubular duct includes a first end portion and a second end portion which are opposite each other, the first end portion including the radial opening which is adapted to be placed in fluid communication with the product release orifice when the tubular duct is at the dispensing position.

5. The machine according to claim 4, wherein the tubular duct includes, between the first end portion and the second end portion, a middle portion having a narrow section portion, where the radial opening is positioned to establish fluid communication with the product recirculation orifice when the tubular duct is at the recirculation, dispensing inhibit position and where there is a further opening which, in use, faces toward an internal side wall of the external conduit.

6. The machine according to claim 5, wherein the first end portion includes a second cavity, which is axially open towards an exterior of the tubular duct and which is separate from the first internal cavity, and a narrow radial section portion, which externally defines a radial cavity and which includes a plurality of radial holes which open internally into the second cavity.

7. The machine according to claim 6, wherein the tubular duct is also movable into a position where at least one portion of the plurality of radial holes are in fluid communication with the product release orifice.

8. The machine according claim 6, wherein the tubular duct is configured such that at the recirculation, dispensing inhibit position, at least a part of the plurality of radial holes is in fluid communication with the product release orifice.

9. The machine according to claim 1, comprising an outlet nozzle which, in use, is in fluid communication with the product recirculation orifice and leads into the tank.

10. The machine according to claim 9, wherein the tank includes on a bottom portion thereof, an opening which is in fluid communication with the product recirculation orifice and the outlet nozzle comprises a first inlet portion having a first fluid flow section and being adapted to be coupled to the opening of the tank and a second, outlet portion having a second fluid flow section different from the first fluid flow section.

11. The machine according to claim 1, wherein the machine is a pasteurizing machine.

12. A method for recirculating a liquid or semi-liquid product in a machine, comprising the following steps:
   providing:
      a tank for containing the product to be processed and dispensed, the tank including a discharge orifice for the product to be dispensed;
      a dispensing tap comprising:
         an external conduit having an inlet orifice which is connected, in use, to the discharge orifice of the tank, a product release orifice and a product recirculation orifice,
         a tubular duct including a first internal cavity including a radial opening, the tubular duct being movably inserted in the external conduit and being movable between a dispensing position, placing the inlet orifice in fluid communication with the product release orifice through the first internal cavity and the radial opening, and a recirculation, dispensing inhibit position, placing the inlet orifice in fluid communication with the product recirculation orifice through the first internal cavity and preventing fluid communication between the inlet orifice and the product release orifice;
   causing the liquid or semi-liquid product to recirculate by withdrawing the liquid or semi-liquid product from the tank through the discharge orifice, causing the liquid or semi-liquid product to flow at least partly inside the external conduit of the dispensing tap and returning the liquid or semi-liquid product into the tank.

13. The method according to claim 12, wherein the step of causing the liquid or semi-liquid product to recirculate comprises a step of changing the direction of movement of the liquid or semi-liquid product inside the external conduit.

14. The method according to claim 13, wherein the step of causing the liquid or semi-liquid product to recirculate comprises a step of reversing the direction of movement of the liquid or semi-liquid product inside the external conduit.

15. The method according to claim 12, wherein the step of causing the liquid or semi-liquid product to recirculate comprises a step of keeping the product release orifice closed while the liquid or semi-liquid product is flowing through the inside of the external conduit.

16. The method according to claim 12, wherein the step of causing the liquid or semi-liquid product to recirculate comprises a step of placing the tubular duct at the recirculation, dispensing inhibit position.

* * * * *